(12) United States Patent
Kimura et al.

(10) Patent No.: US 12,719,506 B2
(45) Date of Patent: Aug. 25, 2026

(54) SIGNAL PROCESSING DEVICE

(71) Applicant: Yokogawa Electric Corporation, Tokyo (JP)

(72) Inventors: Takahiro Kimura, Musashino (JP); Noriaki Kihara, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 310 days.

(21) Appl. No.: 18/231,353

(22) Filed: Aug. 8, 2023

(65) Prior Publication Data

US 2024/0063828 A1 Feb. 22, 2024

(30) Foreign Application Priority Data

Aug. 18, 2022 (JP) ................................ 2022-130742

(51) Int. Cl.
*H04B 1/00* (2006.01)
*H04B 1/10* (2006.01)

(52) U.S. Cl.
CPC ......... *H04B 1/0007* (2013.01); *H04B 1/1009* (2013.01)

(58) Field of Classification Search
None
See application file for complete search history.

(56) References Cited

U.S. PATENT DOCUMENTS

2005/0265269 A1* 12/2005 Saito ........................ H04Q 9/00 370/310
2007/0073495 A1 3/2007 Anderson et al.
2011/0063094 A1* 3/2011 Meiertoberens .. A61M 5/14244 340/12.5
2011/0213216 A1* 9/2011 McKenna ........... A61B 5/0002 600/301
2017/0118541 A1 4/2017 Kajjam et al.

FOREIGN PATENT DOCUMENTS

| | | | |
|---|---|---|---|
| EP | 3163386 | A1 | 5/2017 |
| EP | 3599529 | A1 | 1/2020 |
| JP | H08241486 | A | 9/1996 |
| JP | 2002334389 | A | 11/2002 |
| JP | 2005339424 | A | 12/2005 |
| JP | 2009510360 | A | 3/2009 |
| JP | 2014112409 | A | 6/2014 |
| JP | 2019-120628 | A | 7/2019 |

OTHER PUBLICATIONS

Extended European Search Report (EESR) dated Jan. 23, 2024 and issued for European patent application No. 23186061.0.
Japanese Office Action (JPOA) dated Dec. 17, 2024 issued for Japanese patent application No. 2022-130742 and its English machine translation.
Japanese Office Action (JPOA) dated Mar. 11, 2025 for Japanese Patent Application No. 2022-130742; English machine translation.

* cited by examiner

*Primary Examiner* — Parul H Gupta
(74) *Attorney, Agent, or Firm* — RANKIN, HILL & CLARK LLP

(57) ABSTRACT

A signal processing device includes: a signal processing device configured to process a signal input from a sensor; a wireless communicator configured to wirelessly communicate a signal based on output of the signal processor to an external device; and an isolator that isolates at least a portion of components of the signal processor from the wireless communicator.

3 Claims, 4 Drawing Sheets

Figure 3:
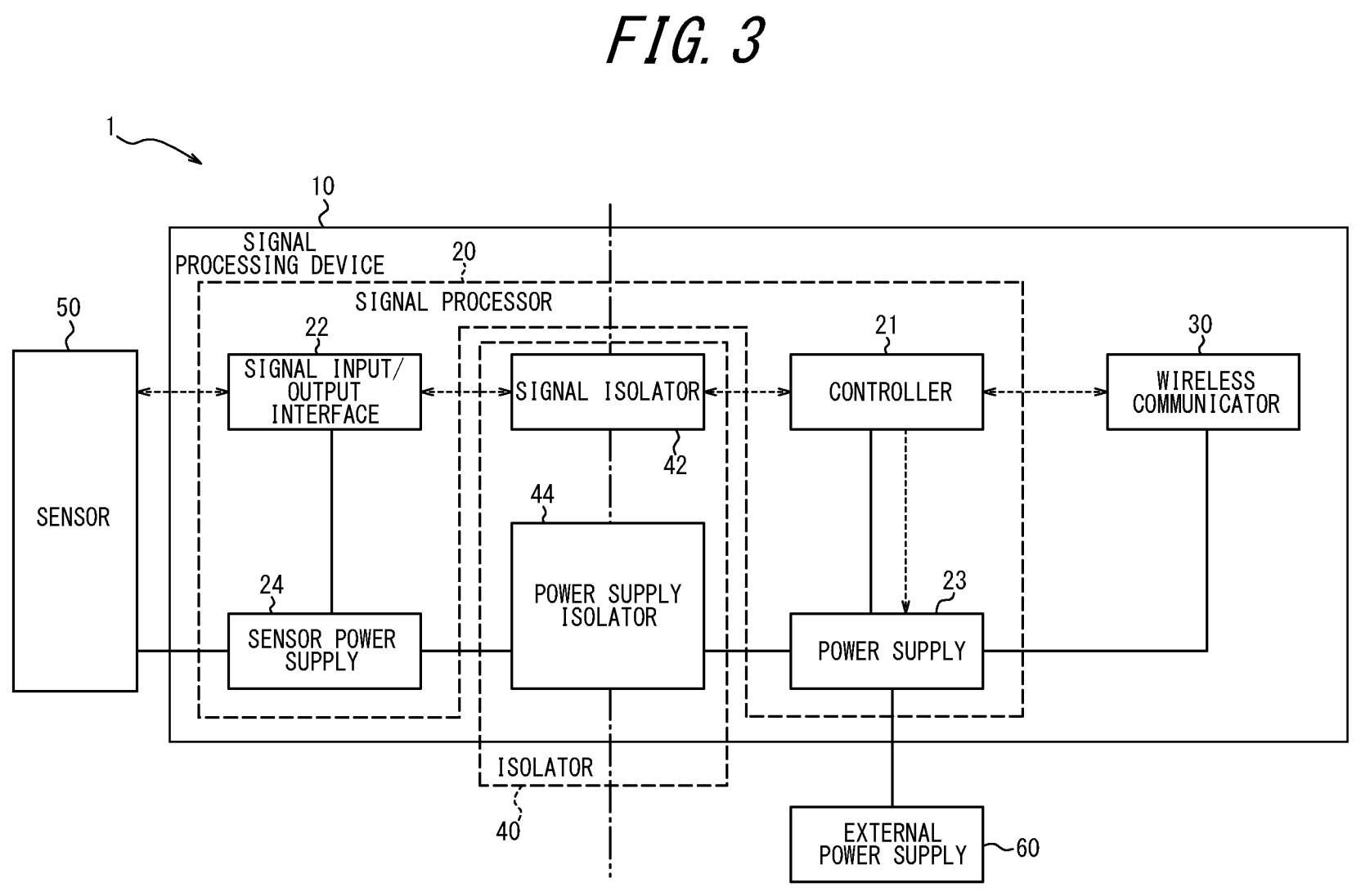

1
10 SIGNAL PROCESSING DEVICE
20 SIGNAL PROCESSOR
21 CONTROLLER
22 SIGNAL INPUT/OUTPUT INTERFACE
23 POWER SUPPLY
24 SENSOR POWER SUPPLY
30 WIRELESS COMMUNICATOR
40 ISOLATOR
42 SIGNAL ISOLATOR
44 POWER SUPPLY ISOLATOR
50 SENSOR
60 EXTERNAL POWER SUPPLY 1
10
SIGNAL PROCESSING DEVICE
20
SIGNAL PROCESSOR
21
CONTROLLER
22
SIGNAL INPUT/OUTPUT INTERFACE
23
POWER SUPPLY
24
SENSOR POWER SUPPLY
30
WIRELESS COMMUNICATOR
40
ISOLATOR
42
SIGNAL ISOLATOR
44
POWER SUPPLY ISOLATOR
50
SENSOR
60
EXTERNAL POWER SUPPLY

Figure 5:
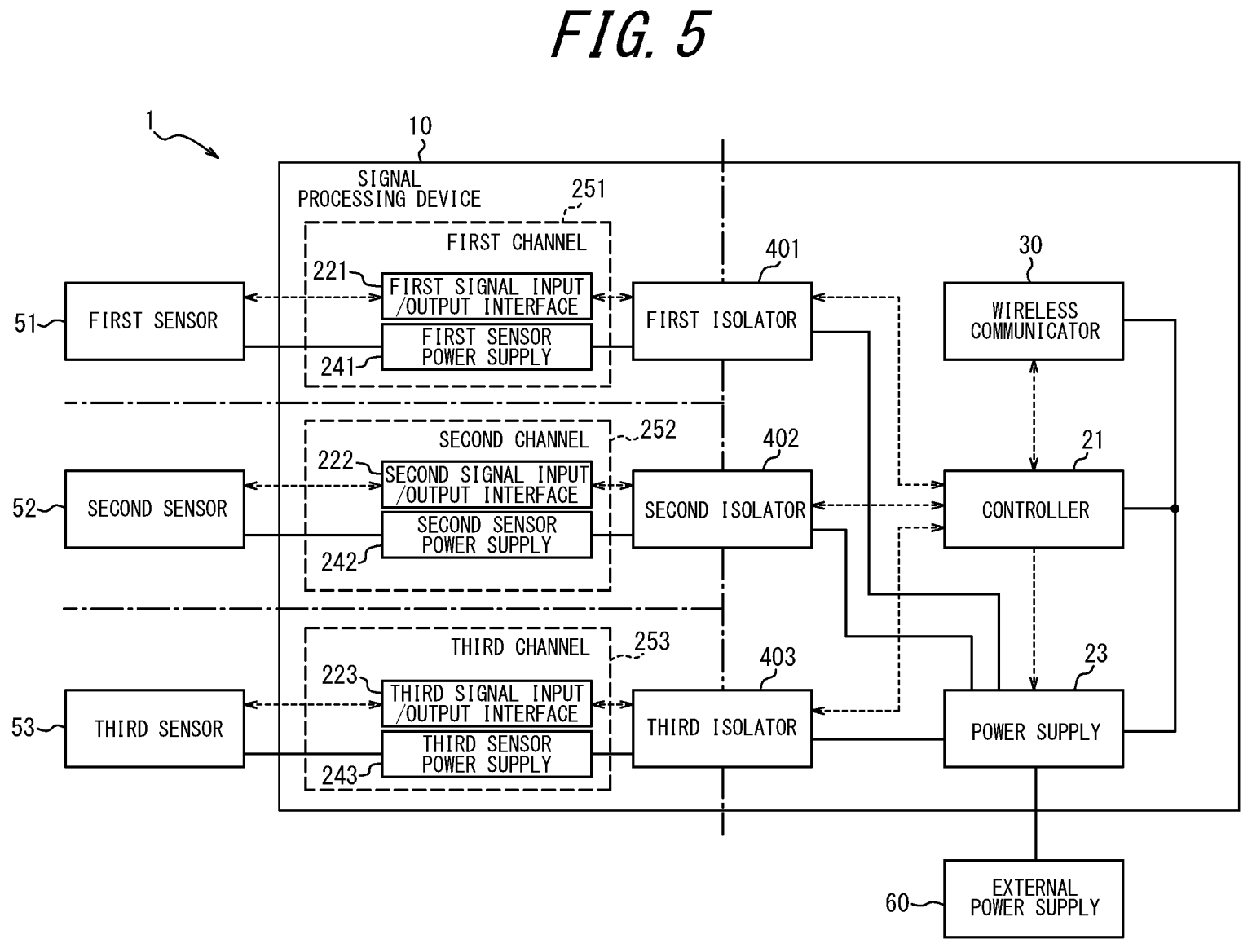

10 SIGNAL PROCESSING DEVICE

30 WIRELESS COMMUNICATOR

21 CONTROLLER

23 POWER SUPPLY

60 EXTERNAL POWER SUPPLY

401 FIRST ISOLATOR

402 SECOND ISOLATOR

403 THIRD ISOLATOR

251 FIRST CHANNEL

221 FIRST SIGNAL INPUT /OUTPUT INTERFACE

241 FIRST SENSOR POWER SUPPLY

252 SECOND CHANNEL

222 SECOND SIGNAL INPUT /OUTPUT INTERFACE

242 SECOND SENSOR POWER SUPPLY

253 THIRD CHANNEL

223 THIRD SIGNAL INPUT /OUTPUT INTERFACE

243 THIRD SENSOR POWER SUPPLY

51 FIRST SENSOR

52 SECOND SENSOR

53 THIRD SENSOR

SIGNAL PROCESSING DEVICE

CROSS-REFERENCE TO RELATED APPLICATION

The present application claims priority to and the benefit of Japanese Patent Application No. 2022-130742 filed Aug. 18, 2022, the entire contents of which are incorporated herein by reference.

TECHNICAL FIELD

The present disclosure relates to a signal processing device.

BACKGROUND

A signal processing device that wirelessly transmits output is conventionally known (for example, see JP 2019-120628 A (PTL 1)).

CITATION LIST

Patent Literature

PTL 1: JP 2019-120628 A

SUMMARY

A signal processing device according to at least one embodiment comprises: a signal processor configured to process a signal input from a sensor; a wireless communicator configured to wirelessly communicate a signal based on output of the signal processor to an external device; and an isolator that isolates at least a portion of components of the signal processor from the wireless communicator.

BRIEF DESCRIPTION OF THE DRAWINGS

In the accompanying drawings:

FIG. 1 is a block diagram illustrating a signal processing device according to a Comparative Example;

FIG. 2 is a block diagram illustrating an example configuration of a signal processing device according to an embodiment;

FIG. 3 is a block diagram illustrating an example configuration in which a signal input/output interface and a sensor power supply of a signal processor are isolated from a wireless communicator;

FIG. 5 is a block diagram illustrating an example configuration in which channels connected one-to-one to sensors are each isolated.

DETAILED DESCRIPTION

Figure 4:
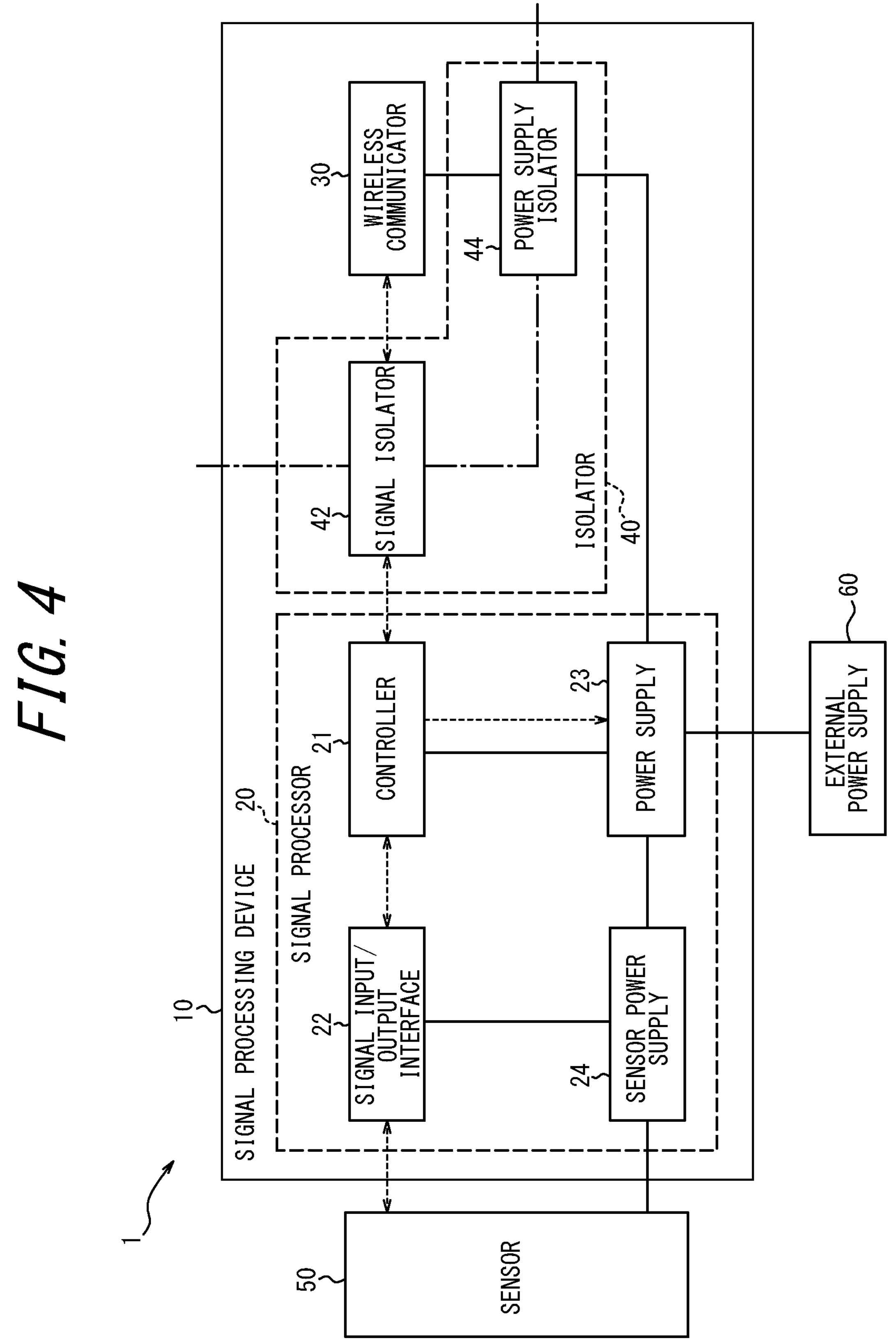
FIG. 4 is a block diagram illustrating an example configuration in which an entirety of a signal processor is isolated from a wireless communicator.

When a wireless communication device and a signal processing device are separate devices, overall size of a device comprising the wireless communication device and the signal processing device will be larger. It would be helpful to provide a signal processing device capable of wirelessly transmitting signals in a compact configuration.

A signal processing device according to at least one embodiment comprises: a signal processor configured to process a signal input from a sensor; a wireless communicator configured to wirelessly communicate a signal based on output of the signal processor to an external device; and an isolator that isolates at least a portion of components of the signal processor from the wireless communicator. In this way, the components of the signal processor may be housed together with the wireless communicator in a compact housing. Further, the components of the signal processor are less susceptible to noise from the wireless communicator. As a result, the signal processing device capable of wirelessly transmitting signals in a compact configuration may be realized.

In the signal processing device according to an embodiment, the components of the signal processor may include at least one of the following: a signal input/output interface to which a signal is input from the sensor; a controller configured to process the signal from the sensor; a sensor power supply configured to supply power to the sensor and the signal input/output interface; and a power supply configured to supply power to the wireless communicator, the controller, and the sensor power supply. The isolator may isolate at least one of the signal input/output interface, the controller, the sensor power supply, and the power supply from the wireless communicator. In this way, the components of the signal processor may be housed together with the wireless communicator in a compact housing. Further, the components of the signal processor are less susceptible to noise from the wireless communicator. As a result, the signal processing device capable of wirelessly transmitting signals in a compact configuration may be realized.

In the signal processing device according to an embodiment, the signal processor may include a plurality of the sensor and channels connected one-to-one to the sensors. The isolator may isolate at least one of the channels from other channels. In this way, mutual influence between channels may be reduced. As a result, the signal processing device capable of wirelessly transmitting signals in a compact configuration may be realized.

In the signal processing device according to an embodiment, the isolator may isolate circuitry including the wireless communicator, the controller, and the power supply from circuitry including the signal input/output interface and the sensor power supply. In this way, arrangement of the isolator may be simplified. Further, a number of components in the isolator may be reduced. As a result, the signal processing device capable of wirelessly transmitting signals in a compact configuration may be realized.

In the signal processing device according to an embodiment, the controller may control the power supply to restart the sensor power supply that supplies power to the sensor for which an abnormality has been detected. In this way, the sensor may be automatically or remotely reactivated when a sensor abnormality is detected. As a result, convenience of the signal processing device may be improved.

According to the present disclosure, the signal processing device capable of wirelessly transmitting signals in a compact configuration is provided.

Comparative Example

A system may include a signal processing device configured to receive an analog signal from a sensor and the like, digitize the analog signal, and transmit the signal to a higher-level system such as a cloud environment via wired communication. However, in a system that uses wired communication, restrictions or costs in setting up the system increase, such as complexity of communication wiring and internal system approval procedures.

Figures 1, 2:
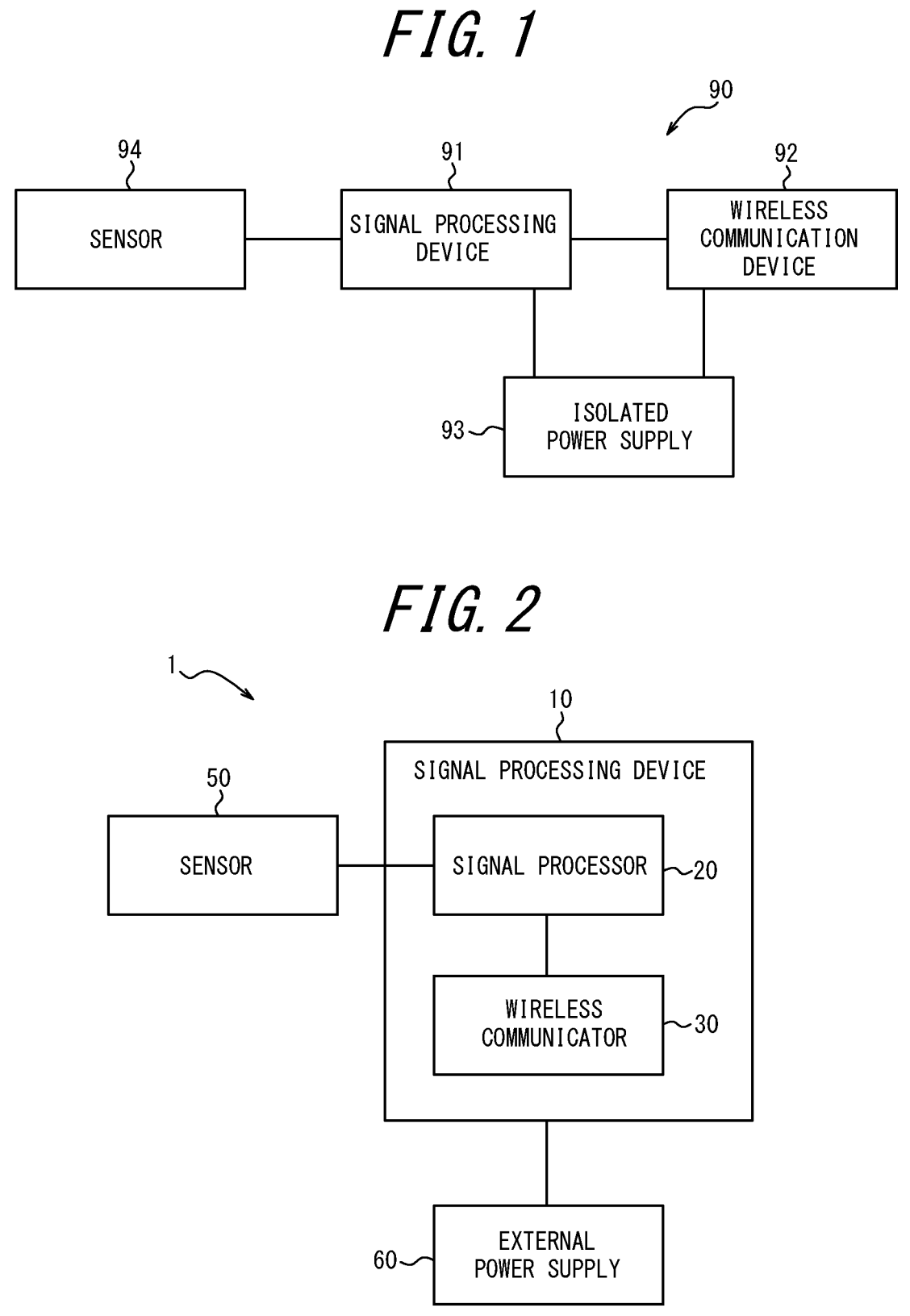

On the other hand, to avoid the complexity of wiring and problems of approval procedures for a communication system, wireless communication may be used instead of wired communication. As illustrated in FIG. 1, a system 90 according to a Comparative Example comprises a signal processing device 91, a wireless communication device 92, an isolated power supply 93, and a sensor 94.

The sensor 94 outputs a signal such as an analog or digital signal representing a measurement result of various physical quantities to the signal processing device 91. The signal processing device 91 converts a signal input from the sensor 94 using various methods such as Ethernet (Ethernet is a registered trademark in Japan, other countries, or both) and RS-485, and outputs the converted signal to the wireless communication device 92. The wireless communication device 92 transmits the signal converted by the signal processing device 91 to an external device via wireless communication. The wireless communication device 92 may also be referred to as a gateway. The wireless communication device 92 includes wireless communication devices such as a Long Term Evolution (LTE) router. The external device includes higher-level systems such as cloud environments. The signal processing device 91 and the wireless communication device 92 are operated by electric power supplied from the isolated power supply 93. The sensor 94 is operated by electric power supplied from the signal processing device 91.

In the system 90 according to the Comparative Example, the signal processing device 91 is configured to be separate from the wireless communication device 92 to be less susceptible to noise generated by the wireless communication of the wireless communication device 92. Further, the signal processing device 91 is isolated from the wireless communication device 92 to be less susceptible to noise generated by the wireless communication of the wireless communication device 92 via a power supply line powered from the isolated power supply 93. In this case, a switchboard or wiring box becomes large. The signal processing device 91 and the wireless communication device 92 are required to be housed in a small housing.

Here, when a wireless communication function and a signal conversion function are arranged close together and housed in a small housing, a problem occurs when they are electrically capacitively coupled, and noise on a sensor wiring side or a wireless communicator side, or fluctuations in power supply, may cause mutual interference and adverse effects between the wireless communication device 92 and an output signal of the sensor 94.

Therefore, the present disclosure describes a signal processing device having a wireless communication function (see FIG. 2) that is compactly housed in a small housing provided with an isolator to isolate the wireless communication function and the signal conversion function. The signal processing device 10 of the present disclosure includes various devices such as signal processing devices, programmable controllers, temperature controllers, flow meters, and transmitters. The signal processing device 10 of the present disclosure may be deployed in markets such as small-scale instrumentation, industrial instruments, transducers, and distributed systems.

Embodiments of the Present Disclosure

As illustrated in FIG. 2, a signal processing system 1 according to an embodiment comprises a signal processing device 10, a sensor 50, and an external power supply 60.

The sensor 50 measures a physical quantity such as pressure or temperature, converts measured data into an electrical signal, and outputs to the signal processing device 10. The sensor 50 may be operated by power supplied by the signal processing device 10. The sensor 50 may be operated by power supplied from another power source and not power supplied by the signal processing device 10. The sensor 50 may be located outside the signal processing device 10, inside the signal processing device 10, or both outside and inside the signal processing device 10.

The external power supply 60 provides electrical power to the signal processing device 10. The external power source 60 may include a battery, fuel cell, or the like, and may include a regulator that converts electric power received from a power grid, or the like. The external power source 60 may be the power grid itself.

The signal processing device 10 comprises a signal processor 20 and a wireless communicator 30. The signal processor 20 processes a signal input from the sensor 50. The signal processor 20 may include, for example, a signal processing device that converts a signal input from the sensor 50 using various methods such as Ethernet (Ethernet is a registered trademark in Japan, other countries, or both) and RS-485. The signal processor 20 is configured to supply electricity to the sensor 50.

The wireless communicator 30 executes wireless communication between the signal processor 20 and an external device, and transmits a signal processed by the signal processor 20 to the external device via wireless communication. In other words, the wireless communicator 30 wirelessly communicates a signal based on output of the signal processor 20 to the external device. The wireless communicator 30 may include wireless communication devices such as an LTE router. The external device may include a higher-level system such as a cloud environment.

Example Configuration of Isolation Between Wireless Communicator and Signal Processor 20

As illustrated in FIG. 3, the signal processing device 10 further comprises an isolator 40. The isolator 40 is configured to isolate the wireless communicator 30 from at least a portion of the signal processor 20. The isolator comprises a signal isolator 42 and a power supply isolator 44. The signal isolator 42 may comprise, for example, a chip having an isolation function, an isolation coupler, or the like, to isolate components connected by signal lines and the wireless communicator 30 from each other. The power supply isolator 44 may comprise, for example, an isolation transformer or the like to isolate components connected by power supply lines from each other. In the block diagram of FIG. 3, the signal processing device 10 is divided into two regions that are isolated from each other by the isolator 40. A boundary between the two regions that are isolated from each other is indicated by a dot-dash line through the signal isolator 42 and the power supply isolator 44. In other words, the signal processing device 10 is isolated at the boundary indicated by the dot-dash line.

The signal processor 20 comprises a controller 21, a signal input/output interface 22, a power supply 23, and a sensor power supply 24. The signal processor 20 is not limited to comprising all of these, and may comprise only a portion of them.

Solid lines connecting each component represent power lines. The power supply 23 supplies electric power supplied from the external power source 60 to each component. The power supply 23 may comprise, for example, a regulator, an inverter, a converter, and the like.

The power supply 23 supplies electric power to the wireless communicator 30, the controller 21, and the sensor power supply 24. The sensor power supply 24 supplies electric power to the signal input/output interface 22 and the sensor 50. The power supply 23 is connected to the signal input/output interface 22 and the sensor power supply 24, respectively, by power supply lines via the power supply isolator 44. In this case, the power supply isolator 44 is configured to electrically isolate the power supply 23 from the signal input/output interface 22 and the sensor power supply 24 while electric power is supplied.

Dashed arrows connecting components represent flow of signals by signal lines. A signal output from the sensor 50 is input to the signal input/output interface 22. The signal input/output interface 22 may include, for example, an analog-to-digital (AD) converter that converts an analog signal output from the sensor 50 into a digital signal. The signal input/output interface 22 may include, for example, a receiver that receives a digital signal such as Highway Addressable Remote Transducer (HART) communication output from the sensor 50.

A signal output from the signal input/output interface 22 is input to the controller 21 via the signal isolator 42. The signal isolator 42 is configured to electrically isolate the signal input/output interface 22 and the controller 21 from each other while transmitting signals. The controller 21 outputs a signal to the wireless communicator 30. The controller 21 may process a signal input from the signal input/output interface 22 and output to the wireless communicator 30, and may output a signal input from the signal input/output interface 22 to the wireless communicator 30 as is.

As mentioned above, in the signal processing device 10 illustrated in FIG. 3, the wireless communicator 30 is isolated from the signal input/output interface 22 and the sensor power supply 24. In other words, the wireless communicator 30 is isolated from at least a portion of the signal processor 20. The signal input/output interface 22 is isolated from the wireless communicator by the signal isolator 42, reducing susceptibility to noise from the wireless communicator 30, even when housed in the same housing as the wireless communicator 30. The signal input/output interface 22 and the sensor power supply 24 being isolated from the wireless communicator 30 by the power supply isolator 44 makes mutual interference between the wireless communicator 30 and the sensor 50 due to fluctuations in the power supply and the like less likely to occur. Further, the wireless communicator 30, the signal input/output interface 22, and the sensor power supply 24 are less likely to adversely affect each other. As a result, the signal processor 20 and the wireless communicator 30 may be housed in a compact housing while also achieving good and stable quality wireless transmission of analog or digital signals input from the sensor 50 or the like.

As illustrated in FIG. 4, in the signal processing system 1 according to an embodiment, the signal processing device 10 may comprise the isolator 40 configured to isolate the wireless communicator 30 from all components of the signal processor 20. Specifically, the signal isolator 42 is configured to isolate the wireless communicator 30 from the controller 21. The controller 21 is connected to the signal input/output interface 22 and the power supply 23 without the signal isolator 42 intervening. The power supply isolator 44 is configured to isolate the wireless communicator 30 from the power supply 23. The power supply 23 is connected to the controller 21, the signal input/output interface 22, and the sensor power supply 24 without the power supply isolator 44 intervening.

Isolating all components of the signal processor 20 from the wireless communicator 30 makes the signal processor 20 less susceptible to noise from the wireless communicator 30, even when housed in the same housing as the wireless communicator 30. Further, all components of the signal processor 20 are isolated from the wireless communicator 30 by the power supply isolator 44, which makes mutual interference between the wireless communicator 30 and the sensor 50 due to power supply fluctuations and the like less likely to occur. As a result, the signal processor 20 and the wireless communicator 30 may be housed in a compact housing while also achieving good and stable quality wireless transmission of analog or digital signals input from the sensor 50 or the like.

In the signal processing device 10 illustrated in FIG. 3 and FIG. 4, the controller 21 is not isolated from the power supply 23 and is able to output a control signal to the power supply 23 via a signal line without the signal isolator 42 intervening.

In the signal processing device 10, components isolated from the wireless communicator 30 may be in any combination. The isolator 40 may be arranged so that only one component among the controller 21, the signal input/output interface 22, the power supply 23, and the sensor power supply 24 is isolated from the wireless communicator 30. For example, when only the controller 21 is isolated from the wireless communicator 30, the signal isolator 42 is located between the controller 21 and the wireless communicator 30, between the controller 21 and the signal input/output interface 22, and between the controller 21 and the power supply 23, respectively. Further, the power supply isolator 44 is located only between the controller 21 and the power supply 23.

The isolator 40 may be arranged so that two components among the controller 21, the signal input/output interface 22, the power supply 23, and the sensor power supply 24 are isolated from the wireless communicator 30. The isolator 40 may be arranged so that three components among the controller 21, the signal input/output interface 22, the power supply 23, and the sensor power supply 24 are isolated from the wireless communicator 30. As illustrated in FIG. 4, the isolator 40 may be arranged so that all four components, the controller 21, the signal input/output interface 22, the power supply 23, and the sensor power supply 24 are isolated from the wireless communicator 30. Regardless of the combination of components isolated from the wireless communicator 30, the components isolated from the wireless communicator 30 are less susceptible to noise from the wireless communicator 30, and mutual interference with the wireless communicator 30 due to fluctuations in power supply and the like is less likely, even when housed in a small housing together with the wireless communicator 30.

The isolator 40 may be arranged to isolate at least one component other than the controller 21 from the wireless communicator 30 without insulating the wireless communicator 30 from the controller 21. In other words, the isolator 40 may be arranged to isolate circuitry including the wireless communicator 30 and the controller 21 from circuitry including at least one of the signal input/output interface 22, the sensor power supply 24, and the power supply 23. When the controller 21, which is connected to the wireless communicator 30 by a communication line, is not isolated from the wireless communicator 30, the arrangement of the isolator 40 may be simplified. Further, the number of units of the signal isolator 42 and number of units of the power supply isolator 44 of the isolator 40 may be reduced.

<Review>

As mentioned above, the signal processing device 10 according to an embodiment allows components that are isolated from the wireless communicator 30 to be housed in a compact housing together with the wireless communicator 30 by insulating at least a portion of the signal processor 20 from the wireless communicator 30. Further, the signal processing device 10 is less susceptible to noise from the wireless communicator 30. As a result, the signal processing device 10 capable of wirelessly transmitting signals in a compact configuration may be realized.

OTHER EMBODIMENTS

Other embodiments are described below.

Example Configuration in which Each Channel is Isolated

As illustrated in FIG. 5, the signal processing device 10 may be configured to be connected to a first sensor 51, a second sensor 52, and a third sensor 53. The signal processing device 10 comprises a first channel 251 connected to the first sensor 51. The first channel 251 includes a first signal input/output interface 221 to which a signal from the first sensor 51 is input, and a first sensor power supply 241 that supplies power to the first sensor 51. The signal processing device 10 comprises a second channel 252 connected to the second sensor 52. The second channel 252 includes a second signal input/output interface 222 to which a signal from the second sensor 52 is input, and a second sensor power supply 242 that supplies power to the second sensor 52. The signal processing device 10 comprises a third channel 253 connected to the third sensor 53. The third channel 253 includes a third signal input/output 223 to which a signal from the third sensor 53 is input, and a third sensor power supply 243 that supplies power to the third sensor 53.

The signal processing device 10 further comprises a first isolator 401 that isolates the first channel 251 from other components. The first isolator 401 is arranged to isolate the first channel 251 from the second channel 252, the third channel 253, the wireless communicator 30, the controller 21, and the power supply 23. The first isolator 401 includes the signal isolator 42 connected between the controller 21 and the first signal input/output interface 221, and the power supply isolator 44 connected between the power supply 23 and the first sensor power supply 241. The signal processing device 10 further comprises a second isolator 402 that isolates the second channel 252 from other components. The second isolator 402 is arranged to isolate the second channel 252 from the first channel 251, the third channel 253, the wireless communicator 30, the controller 21, and the power supply 23. The second isolator 402 includes the signal isolator 42 connected between the controller 21 and the second signal input/output interface 222, and the power supply isolator 44 connected between the power supply 23 and the second sensor power supply 242. The signal processing device 10 further comprises a third isolator 403 that isolates the third channel 253 from other components. The third isolator 403 is arranged to isolate the third channel 253 from the first channel 251, the second channel 252, the wireless communicator 30, the controller 21, and the power supply 23. The third isolator 403 includes the signal isolator 42 connected between the controller 21 and the third signal input/output interface 223, and the power supply isolator 44 connected between the power supply 23 and the third sensor power supply 243.

By insulating channels from each other, mutual effects between channels may be reduced. The number of channels is not limited to the three illustrated in FIG. 5, and may be two or less or four or more. Regardless of the number of channels, the isolator 40 may be arranged so that all channels are isolated from each other. Channels may be divided into groups containing one or more channels. The isolator 40 may be arranged so that groups are isolated from each other.

<Control of Power Supply 23 by Controller 21>

As illustrated in FIG. 3-5, the controller 21 may generate a signal to control the power supply 23 and output the signal to the power supply 23. The controller 21 may determine a status of each component, such as the sensor 50, based on signals input from the signal input/output interface 22. The controller 21 may generate a signal to control the power supply from the power supply 23 to each component based on a result of the determination of the status of each component and output the signal to the power supply 23.

Specifically, the controller 21 may control the power supply 23 to stop power supply to a portion of the components powered by the power supply 23, then restart power supply in order to restart the components to which power supply was stopped. In an arrangement where the controller 21 is not isolated from the wireless communicator 30, as illustrated in FIG. 3, the controller 21 may control the power supply 23 to stop and restart power supply to the signal input/output interface 22 or the sensor power supply 24 that are isolated from the wireless communicator 30.

The controller 21 may, for example, control the power supply 23 to restart the signal input/output interface 22 or the sensor power supply 24 when a signal input from the signal input/output interface 22 indicates an abnormality of the sensor 50. In this way, the sensor 50 powered from the sensor power supply 24 may be automatically or remotely restarted when an abnormality of the sensor 50 is detected. As a result, the convenience of the signal processing device 10 may be improved.

The controller 21 may, for example, control the power supply 23 so that the sensor power supply 24 is turned on only when needed. In this way, power saving of the sensor 50 may be achieved.

Although embodiments of the present disclosure have been described based on the drawings and examples, it should be noted that a person skilled in the art may make variations and modifications based on the present disclosure. Therefore, it should be noted that such variations and modifications are included within the scope of the present disclosure. For example, functions and the like included in each component may be rearranged, and multiple components may be combined into one or divided, as long as no logical inconsistency results.

The invention claimed is:

1. A signal processing device comprising:

a signal processor configured to process a signal input from a sensor;

a wireless communicator configured to wirelessly communicate a signal based on output of the signal processor to an external device, wherein the signal processor and the wireless communicator are housed in a same housing; and an isolator that electrically isolates all components of the signal processor from the wireless communicator, wherein the components of the signal processor include;

a controller configured to process the signal from the sensor; and a power supply connected to the controller and configured to supply power to the wireless communicator and the controller, and wherein the isolator comprises:

a signal isolator connecting the wireless communicator and the controller and configured to electrically isolate the wireless communicator from the controller; and a power supply isolator connecting the wireless communicator and the power supply and configured to electrically isolate the wireless communicator from the power supply.

2. The signal processing device of claim 1, wherein the components of the signal processor further include:

a signal input/output interface connected to the sensor and the controller and configured to receive an analog signal from the sensor, convert the analog signal into a digital signal, and output the digital signal to the controller; and a sensor power supply connected to the sensor, the signal input/output interface, and the power supply and configured to supply power to the sensor and the signal input/output interface, and receive power from the power supply.

3. The signal processing device of claim 2, wherein the controller controls the power supply to restart the sensor power supply that supplies power to the sensor for which an abnormality has been detected.

* * * * *